(12) United States Patent
Barbeau (10) Patent No.: US 7,868,910 B1
(45) Date of Patent: Jan. 11, 2011

(54) METHOD AND SYSTEM FOR AN INCENTIVE PROGRAM BASED ON CAMERA PHONE USAGE

(75) Inventor: Pierre Barbeau, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1493 days.

(21) Appl. No.: 11/243,644

(22) Filed: Oct. 5, 2005

(51) Int. Cl.
*H04N 7/14* (2006.01)

(52) U.S. Cl. .............. 348/14.01; 348/14.02; 348/14.03; 455/556.1; 455/556.2

(58) Field of Classification Search ... 348/14.01–14.16; 370/352, 356
See application file for complete search history.

(56) References Cited

U.S. PATENT DOCUMENTS

2002/0194064 A1* 12/2002 Parry et al. ................... 705/14
2006/0029050 A1*  2/2006 Harris et al. ................. 370/356

OTHER PUBLICATIONS

*The Simple, Easy and Fun Way to Get Free Products*, http://www.paidoptin.com, printed from the World Wide Web May 13, 2004.
Vodafone 4U: a new reward program for Vodafone Malta customers, http://www.vodafone.com/article_with_thumbnail/0,3038, OPCO%253D40008%2526CATEGORY_ID%253D200%2526MT_ID%253Dpr%2526LANGUAGE_ID%253D0%2526CONTENT_ID%253D206099,00.html, Nov. 24, 2002.
*Club Extra Gold Membership*, http://www.extrafilm.com.au/clubextra/about_clubextra_gold.htm, printed from the World Wide Web on Jun. 7, 2005.
*Extrafilm—Frequently Asked Questions*, http://www.extrafilm.com.au/faqs/faq_clubgold.htm, printed from the World Wide Web on Jun. 7, 2005.

* cited by examiner

*Primary Examiner*—Melur Ramakrishnaiah (57) ABSTRACT

A method and system for (i) detecting each performance of any function of a plurality of functions associated with an incentive program, (ii) changing a stored value in response to detecting each performance of the function(s) associated with the incentive program, and (iii) transmitting to a network, an update value that corresponds to the stored value, for transmission in turn of the update value to a system coupled to the network. An incentive program may be arranged to provide incentive for users to perform the functions associated with the incentive program, so as to facilitate an entity in achieving a given objective or set of objectives. The incentive provided to the users may take the form of an award and is based on the update value(s) transmitted to the network.

24 Claims, 3 Drawing Sheets

METHOD AND SYSTEM FOR AN INCENTIVE PROGRAM BASED ON CAMERA PHONE USAGE

BACKGROUND

1. Field of Invention

The present invention relates to camera phones, and more particularly to camera phone services.

2. Description of Related Art

Camera phones have become a popular alternative to traditional wireless communication devices, in part, because camera phones include both (i) cellular wireless communication functionality, and (ii) digital camera functionality that facilitates the capture of digital images, whereas traditional wireless communication devices include cellular wireless communication functionality, but do not include digital camera functionality.

In most cases, the cellular wireless communication functionality provides for wireless packet data communication (e.g., Third Generation Mobile System (3G) communication), so that the camera phone can engage in IP communication with network servers and other devices via a cellular carrier's radio access network (RAN). More particularly, the wireless communication functionality provides for establishing a radio link with the RAN and a data link (e.g., point to point protocol (PPP) link) with a gateway such as a packet data serving node (PDSN). Through those links, a camera phone sends and receives packet data over a packet-switched network such as the carrier's core packet network and/or the Internet. The packet data may comprise a digital image captured using the digital camera functionality.

As the popularity of camera phones has increased, service providers (e.g., providers of services to camera phone users) have introduced new services that may increase a person's desire to own and use a camera phone. For example, service providers may provide camera phone users with a personal account, accessible over the Internet, for uploading digital images and for organizing and securing digital images in a digital photo album. As another example, service providers may improve the look of digital images stored in a digital photo album by improving the color, contrast, and brightness of the digital images or by performing red-eye reduction on the digital images.

Service providers may employ a network infrastructure to provide their services. A typical network infrastructure may include a wireless network, a wired network, and/or a server coupled to the wired network. Service providers may own the network infrastructure, own a portion of the network infrastructure, and/or enter into an agreement whereby the service providers pay an owner of the network infrastructure for the right to use the network infrastructure.

Service providers incur an expense (hereinafter an "infrastructure expense") by employing a network infrastructure to provide their services. Service providers may have various arrangements for recovering their infrastructure expense and for making a profit as well. For example, services providers may recover their infrastructure expense and make a profit by charging camera phone users a fee each time the camera phone users use the network infrastructure for performance of a service. With such an arrangement, service providers may recover their infrastructure expense and maximize their profits if camera phone users maximize their use of the network infrastructure. Thus, a mechanism for motivating camera phone users to use camera phone functions that lead to use of a network infrastructure is desired.

SUMMARY

The present invention advances over the existing art by providing a mechanism for use with an incentive program. The incentive program may involve rewarding camera phone users who perform functions associated with the incentive program. The functions associated with the incentive program may be functions carried out within a camera phone and/or functions carried out remotely from the camera phone.

As presently contemplated, a camera phone will (i) detect the performance of functions associated with an incentive program, (ii) change a stored value in response to detecting each performance of any of the functions associated with the incentive program, and (iii) transmit to a network an update value that corresponds to the stored value, for further transmission of the update value to a system coupled to the network. The update value can then be added to a cumulative value stored in the system, and, thereafter, a camera phone user can receive an award for performing the functions associated with the incentive program, based on the cumulative value stored in the system.

In one respect, an exemplary embodiment of the invention may take the form of a camera phone that comprises a processor, data storage, and a communication interface. The processor executes program logic to (i) detect each performance of any of the functions associated with an incentive program, and (ii) change a stored value in response to detecting each performance of any of the functions associated with the incentive program. The data storage stores the program logic and the stored value. The communication interface transmits an update value to a network, for transmission of the update value in turn to a system coupled to the network.

In another respect, the exemplary embodiment of the invention may take the form of a method carried out in a camera phone, where the method comprises (i) detecting each performance of any of a plurality of functions associated with an incentive program, (ii) changing a stored value in response to detecting each performance of any of the plurality of functions associated with the incentive program, and (iii) transmitting an update value to a network, for transmission in turn of the update value to a system coupled to the network.

Advantageously, by providing a mechanism for use with an incentive program, an entity that implements the incentive program may (i) motivate users to perform the functions associated with the incentive program, and (ii) achieve a given objective as a result of the users performing the functions associated with the incentive program.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

According to the exemplary embodiment, a mechanism within a camera phone (i) detects each performance of any function of a plurality of functions associated with an incentive program, (ii) changes a stored value in response to detecting each performance of any function of the plurality of functions, and (iii) transmits to a network, an update value that corresponds to the stored value, for transmission in turn of the update value to a system coupled to the network.

An incentive program is a program that may be implemented by an entity. In describing incentive programs herein, the term "entity" may indicate either a single entity and/or a plurality of entities. Further, an entity that implements an incentive program may comprise an entity that (i) implements the incentive program itself, or (ii) has a third party implement the incentive program.

Various types of entities may implement an incentive program. For example, an entity that implements an incentive program, may be a product manufacturer, such as a camera phone manufacturer. As another example, an entity that implements an incentive program, may be a service provider, such as a service provider that (i) operates a wireless network and/or a wired packet-switched data network for use by camera phone users, and/or (ii) operates a system, coupled to a network, for use by camera phone users. Other examples of the various types of entities that may implement an incentive program are also possible.

An entity may implement an incentive program to enable the entity to achieve a given objective. For example, an entity may implement an incentive program to facilitate achieving an objective of increasing product sales, such as increasing the sales of camera phones. As another example, an entity may implement an incentive program to facilitate achieving an objective of increasing its revenue attributable to the use of a network infrastructure such as network infrastructure that includes a wireless network, a wired packet-switched data network, and/or a remote data storage device coupled to a network. Other examples of an entity implementing an incentive program to achieve a given objective are also possible.

Incentive programs may be arranged in various ways to enable an entity to achieve its given objective. Incentive programs typically provide incentive for a group of people (the "incentive group") to act or refrain from acting in a predefined manner. For example, an incentive program may provide incentive for an incentive group (e.g., camera phone users) to perform any functions of a plurality of functions associated with the incentive program. In this regard, the plurality of functions associated with the incentive program may comprise functions that are carried out within a camera phone.

Various forms of incentive are available to motivate an incentive group. For example, the incentive may take the form a service award: A service award is an award that allows a member of the incentive group to have a given service performed at a reduced cost (e.g., no cost) as compared to the fee typically charged for the given service. Examples of the given service include: (i) storing digital images at a data storage device remote from a camera phone, (ii) accessing a radio access network (RAN) and/or a packet-switched network, to transmit digital images to a given destination such as a remote camera phone or a digital photo album at a remote data storage device, (iii) interfacing with a RAN to perform voice communications, and (iv) interfacing with a RAN to send and/or receive text messages, such as short message service (SMS) messages. Other examples of the given service are also possible.

As another example, the incentive to motivate the incentive group may take the form of a product award. A product award is an award in the form of a product. For example, a product award may comprise a product such as a camera phone accessory (e.g., a camera phone battery, or a wireless headset comprising a microphone and speakers). As another example, a product award may comprise a product that is not a camera phone accessory (e.g., golf equipment, or articles of clothing). Other examples of a product award are also possible.

Each incentive may be associated with a respective incentive value. An incentive value for a given incentive represents a value a camera phone user must achieve to be awarded the given incentive. By way of example, an incentive value associated with an incentive comprising a camera phone battery may be 10,000, an incentive value associated with an incentive comprising a wireless headset may be 12,000, and an incentive value associated with an incentive comprising one hour of interfacing with a RAN to perform voice communications at a reduced cost may be 5,000. Other examples of incentive values for various incentives are also possible.

Incentive values can be values having any of a variety of designated units. For example, incentive values could have designated units of a monetary value, such as United States (U.S.) Dollars. In this case, an incentive value of 50 would represent 50 U.S. Dollars, which in turn could be redeemed for an incentive award having a value (and/or cost) of 50 U.S. Dollars or substantially near 50 U.S. Dollars. As another example, incentive values could have designated units of "earned points." In this regard, each earned point may be worth a given monetary value, such as 0.01 U.S. Dollars. In such a case, an incentive value of 12,000 earned points would equate to 120 U.S. Dollars (and could be redeemed for an incentive award, such as a wireless headset, having a value (and/or cost) of 120 U.S. Dollars or substantially near 120 U.S. Dollars). Other examples of the designated units for incentive values are also possible.

The update values sent to the system via the network are added to a respective cumulative value for each camera phone user. After the camera phone user's cumulative value is equivalent to or greater than a given incentive value, the camera phone user can request to receive an incentive award that has an incentive value less than or equal to his or her respective cumulative value. After decrementing the cumulative value by the amount of the incentive value of the requested incentive award, the cumulative value may be large enough to request and receive additional incentive awards, and/or could form a basis for adding additional update values so that the camera phone user can earn additional incentive awards.

2. Exemplary Architecture

Figure 1:
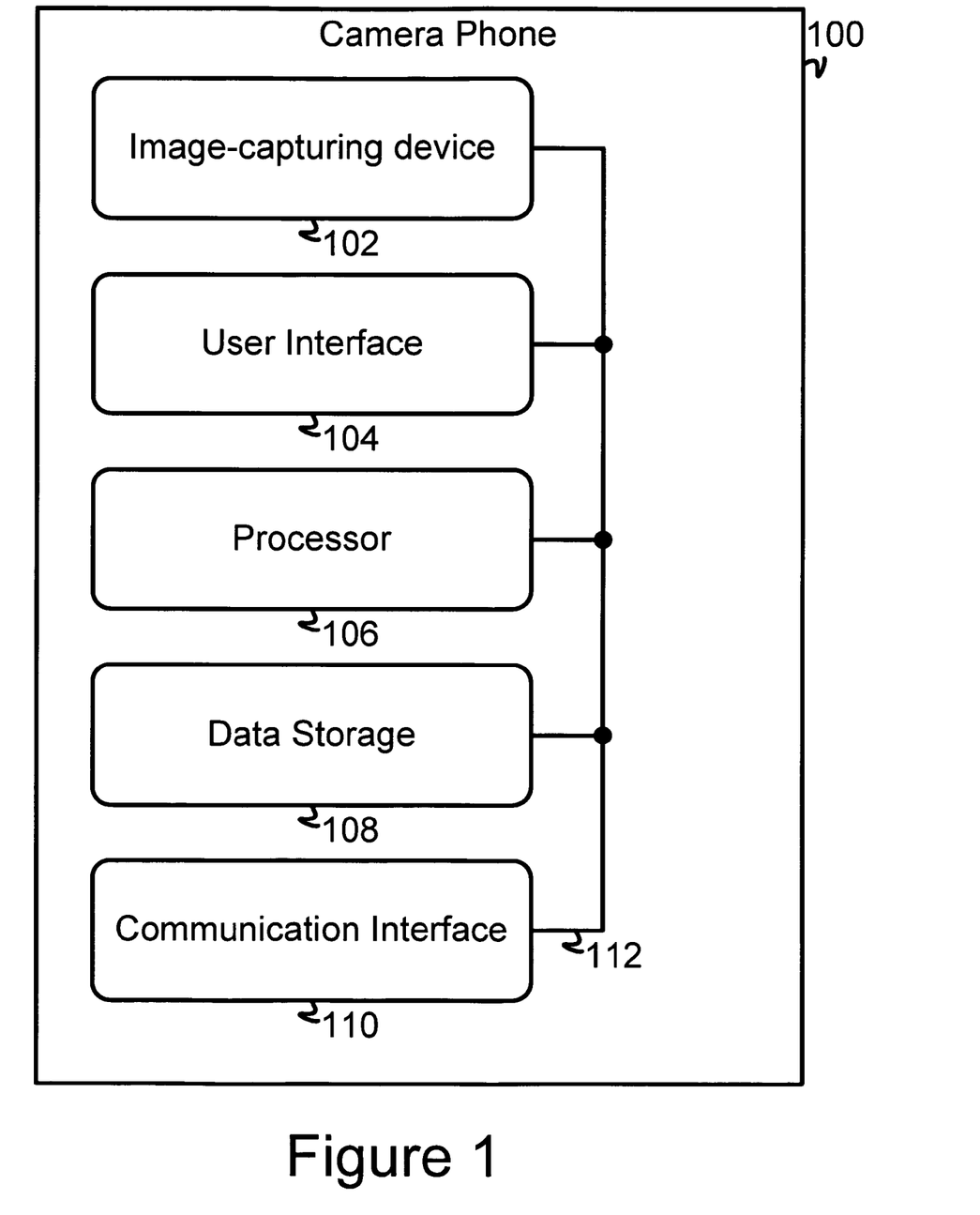
FIG. 1 is a simplified block diagram of a camera phone in which an exemplary embodiment can be implemented.

The exemplary embodiment may be carried out in a camera phone 100 as shown in FIG. 1. As illustrated, the camera phone 100 includes (i) an image capturing device 102, (ii) a user interface 104, (iii) a processor 106, (iv) data storage 108, and (v) a communication interface 110, all linked together via a system bus, network, or other connection mechanism 112.

The image capturing device 102 may be arranged as (i) a digital camera integrated into the camera phone 100 so as to form a unitary device, or (ii) a stand-alone digital camera that a camera phone user can connect to (and disconnect from) the camera phone 100. Typically, the image capturing device 102 includes (i) a lens for focusing light from a subject being photographed, (ii) a light source for illuminating the subject, and (iii) an image source for (a) detecting light from the subject, (b) converting light from the subject to an array of electrical charges, and (c) storing an array of digital values representing the array of electrical charges.

The image capturing device 102 may comprise an image sensor that includes light sensitive diodes that convert light from a subject into electrical charges. Commonly used images sensors include charge coupled device (CCD) image sensors and complementary metal oxide semiconductor (CMOS) image sensors. Alternatively, the image capturing device 102 could comprise an optical scanner device or some other means suitable for capturing digital images.

An image captured by the image capturing device 102 may be arranged in various configurations. For example, the image may comprise a single image or a series of images (e.g., a video sequence of images). As another example, the image may be stored in any of a variety of image storing formats, such as a bitmap format or a Joint Photographic Experts Group (JPEG) format. Other examples of the various configurations of a captured image are also possible.

The user interface 104 provides an interface between the camera phone 100 and a camera phone user. The user interface 104 may comprise various mechanisms to facilitate carrying out digital camera functions and/or wireless communication functions, via the camera phone 100. The user interface 104 may include an input mechanism that produces signals that trigger the execution of digital camera functions and/or wireless communication functions. For example, the input mechanism may comprise a shutter-release button that produces a signal that triggers capturing a digital image via the image capturing device 102.

As another example, the input mechanism may comprise a keypad having keys that produce a respective signal when pressed. In this regard, the keypad may include keys that produce signals that trigger the performance of digital camera functions, such as (i) selecting a given image from a set of images, (ii) sending a given image to a network, (iii) deleting a given image, and (iv) editing a given image. Further, in this regard, the keypad may include keys that produce signals that trigger the performance of wireless communication functions, such as (i) dialing a telephone number, (ii) selecting a telephone number from a list of telephone numbers, and (iii) answering an incoming phone call. Other examples of the keys that produce a respective signal when pressed to perform digital camera functions and/or wireless communication functions are also possible.

The user interface 104 may include an output mechanism for providing data/information from the camera phone 100 to a camera phone user. The output mechanism of the user interface 104 may provide the data/information in any of a variety of formats. For example, an output mechanism of the user interface 104 may include a display, such as a liquid crystal display (LCD), for providing the data/information in a visual format. The data/information in a visual format may include (i) a digital image, (ii) a stored value, (iii) a menu that lists functions associated with an incentive program, (iv) caller identification information for an incoming phone call, or (v) an indication that the stored value is greater than or equal to a given incentive value. In this regard, a camera phone user may choose the given incentive value based on a particular award the user would like to receive. Other examples of data/information in a visual format are also possible.

As another example, the output mechanism of the user interface 104 may include a speaker for providing the data/information in an audible format. The data/information in an audible format may include (i) a ring tone that indicates an incoming phone call is available for answering, (ii) an audible tone that indicates the stored value is greater than or equal to a given incentive value, or (iii) an audible tone that indicates a function of the plurality of functions associated with the incentive program has been performed. Other examples of data/information in an audible format are also possible.

As yet another example, the output mechanism of the user interface 104 may include means for providing the data/information in a vibratory or other tactile format. The data/information in a vibratory format may include (i) a vibration that indicates an incoming phone call is available for answering, (ii) a vibration that indicates the stored value is greater than or equal to a given incentive value, or (iii) a vibration that indicates a function of the plurality of functions associated with the incentive program has been performed. The means for providing data/information in a vibratory format may comprise (i) a motor having a spindle, and a weight attached to the motor spindle, or (ii) a vibrating battery. Other examples of data/information in a vibratory format or the means for providing data/information in a vibratory format are also possible.

The processor 106 may comprise one or more processors (e.g., a general purpose processor and/or a digital signal processor). The processor 106 provides means for executing program logic that allows the processor 106 to work in cooperation with the image capturing device 102, the user interface 104, the data storage 108, and the communication interface 110, so as to carry out the functions described herein.

The program logic, executable by the processor 106, may include logic for detecting the performance of any function of a plurality of functions associated with an incentive program. The plurality of functions associated with the incentive program may include functions of a first type and functions of a second type. In this regard, the functions of the first type may comprise functions that facilitate an entity achieving its objective, and the functions of the second type may comprise functions that do not facilitate an entity achieving its objective. Other methods of classifying functions besides classifying the functions as functions of the first type and functions of the second type are also possible.

Examples of functions of the first type include: (i) capturing an image with the image capturing device 102, (ii) sending, via the communication interface 110, an image to share with another device and/or person, (iii) sending, via the communication interface 110, an image to store at a remote data storage device, (iv) accessing an image stored at the data storage 108 or at a remote data storage device, (v) receiving an image from a network via the communication interface 110, (vi) viewing an image, (vii) formatting an image, (viii) applying a fun-frame graphic to an image, (ix) editing an image, (x) correlating an image with a recipient identifier (e.g., an e-mail address, or a mobile telephone number), and (xi) sending a signal to enroll a camera phone user in an incentive program.

Sending an image to share may involve sending an image from a first camera phone to another device, such as a second camera phone. In this way, the other device could receive the image and then display the image on an LCD. Sending an image to store may involve sending an image from a camera phone to a remote storage device that stores the image in a digital photo album so that the image can be accessed by those who access the photo album. Other examples of sending an image to share or sending an image to store are also possible.

Formatting the image may include selecting an image resolution, such as 1280×1024 pixels, or 800×600 pixels. Editing the image may include performing red-eye reduction, resizing the image, or changing the color, brightness, and/or contrast of the image. Other examples of formatting the image or editing the image are also possible.

Applying a fun-frame graphic to an image may include overlaying a first digital image (e.g., the fun-frame graphic) on top of a second digital image (e.g., an image captured by the image capturing device 102). In this regard, the fun-frame graphic may take the form of an image border that covers the image except for a center-portion of the image. Other examples of applying a fun-frame graphic to an image, as well as other examples of the functions of the first type, are also possible.

Examples of functions of the second type include: (i) deleting a digital image, (ii) deleting a digital image that has not been sent to share, (iii) deleting a digital image that has not been sent to store at a remote data storage device, and (iv) sending a signal to end a camera phone user's participation in an incentive program. Other examples of the functions of the second type are also possible.

Further, the program logic, executable by the processor 106, may include logic for changing a stored value in response to detecting each performance of any function of a plurality of functions associated with an incentive program. The program logic for changing a stored value may be arranged in various configurations. For example, the program logic for changing a stored value may be arranged such that the stored value is changed after detection of a single performance of a function from the plurality of functions associated with the incentive program. As another example, the program logic for changing a stored value may be arranged such that the stored value is changed after detecting performance of a series of (two or more) functions of the plurality of functions. As yet another example, the program logic for changing a stored value may be arranged such that the stored value is incremented if the function performed and detected is a function of the first type. As still yet another example, the program logic for changing a stored value may be arranged to decrement the stored value if the function performed and detected is a function of the second type.

Further still, the program logic, executable by the processor 106, may include logic for producing an update value that corresponds to the stored value. An update value may comprise a value that is transmitted to a network, for transmission in turn, to a system coupled to the network. The system may store a respective cumulative value for each camera phone enrolled in the incentive program. A cumulative value may comprise a value that is (i) a sum of all update values sent to the system for a given camera phone and a given camera phone user, and (ii) reduced by the incentive value for each and every incentive awarded to the given camera phone user. The program logic for producing the update value may be arranged to produce a message that comprises the update value and an identifier that correlates the update value and/or the message to a respective cumulative value (e.g., a respective camera phone user's incentive account record), such that the update value may be added to the respective cumulative value.

The update value may be equivalent to the stored value. Alternatively, the update value may be a value that is based on the stored value but that is not equivalent to the stored value. For example, the update value could be a value determined by multiplying the stored value by an adjustment factor, such as an adjustment factor of 1.5. An adjustment factor may be used during a given time period to provide extra incentive for users to perform the functions associated with the incentive program during the given time period. In this regard, for example, the given time period could comprise a time when use of a network infrastructure is not at a maximum level of use (i.e., an "off-peak time"), such as between the hours of 10:00 PM and 6:00 AM, or between the hours of 12:01 AM on Saturdays to 11:59 PM on Sundays.

As another example, the update value may be equal to a percentage of the stored value such that the update value when added with a cumulative value is sufficient to enable the camera phone user to obtain a given incentive award. Other examples of determining an update value based on a stored value are also possible.

Further still yet, the program logic, executable by the processor 106, may include logic for decrementing the stored value by an amount that corresponds to an update value transmitted to the network. In this regard, the update value may correspond to a given instance of functions performed and detected, and decrementing the stored value by an amount that corresponds to the update value may occur so that any subsequent update values sent to the network do not correspond to the given instance of functions performed and detected. In this way, a cumulative value will not be increased more than once for the given instance of functions performed and detected. Execution of the program logic for decrementing the stored value by an amount that corresponds to the update value may be executed at various times, such as after transmission of the update value to the network, or after receiving an acknowledgement that indicates the system has received the update value.

The data storage 108 provides means for storing various types of data. For example, the data storage 108 may store data in the form of program logic that is executable by the processor 106, such as the program logic described herein. As another example, the data storage 108 may store data in the form of a stored value or an update value. Other examples of the data the data storage 108 may store are also possible.

In order to store data, the data storage 108 may comprise a computer readable medium, such as a magnetic disc, an optical disc, organic memory, and/or any other volatile or non-volatile mass storage system readable by the processor 106. Alternatively, the data storage 108 may comprise a combination of two or more segments of computer readable media. For example, data storage 108 may comprises a first segment of data storage located in the processor 106 and a second segment of data storage remote from the processor 106. Other examples of data storage segments are also possible.

The communication interface 110 provides means for sending and receiving communications. The communication interface 110 may send communications to other portions of the wireless camera phone 100, such as to the processor 106, via the system bus 112, and to an entity external to the wireless camera phone 100. The communication interface 110 may receive communications from other portions of the wireless camera phone 100, such as from the processor 106, via the system bus 112, and from an entity external to the wireless camera phone 100.

The sending of communications to an entity external to the camera phone 100 and receiving communication from an entity external to the camera phone 100 may occur via an air interface. An air interface is described below with respect to FIG. 2. The communication interface 110 may include a chipset and antenna for performing communications over the air interface according to an air interface protocol. An exemplary air interface protocol is the Code Division Multiple Access (CDMA) protocol. Other air interface protocols such as Time Division Multiple Access (TDMA), Advanced Mobile Phone System/Service (AMPS), and Global System for Mobile Communications (GSM) are examples as well. An exemplary chipset that facilitates air interface communication according to the CDMA protocol is the MSM6000™ chipset manufactured by Qualcomm Incorporated of San Diego, Calif.

The communication interface 110 may send various communications to an entity external to the camera phone 100. For example, the communication interface 110 may send communications such as (i) an update value, (ii) a digital image, (iii) a message to originate a voice call, or (iv) messages to negotiate with a packet-switched network gateway to establish a packet-data connection. A packet-switched network gateway is describe below with reference to FIG. 2. Prior to sending any of the various communications to an entity external to the camera phone 100, the communication interface 110 may receive those communications from other portions of the camera phone via the system bus 112. Other examples of the various communications the communication interface 110 may send to an entity external to the camera phone 100 are also possible.

Similarly, the communication interface 110 may receive various communications sent from an entity external to the camera phone 100. For example, the communication interface 110 may receive (i) messages indicating when incoming voice calls are available for answering, (ii) text messages, (iii) application software for carrying out new camera phone functions, (iv) control logic for instructing the camera phone to begin (or stop) detecting camera phone functions associated with an incentive program, or (v) messages for negotiating with a packet-switched network gateway to establish a packet-data connection. After receiving any of the various communications sent from an entity external to the camera phone 100, the communication interface 110 may send the various communications to other portions of the camera phone 100 via the system bus 112. Other examples of the communications the communication interface 110 may receive from an entity external to the camera phone 100 are also possible.

Figure 2:
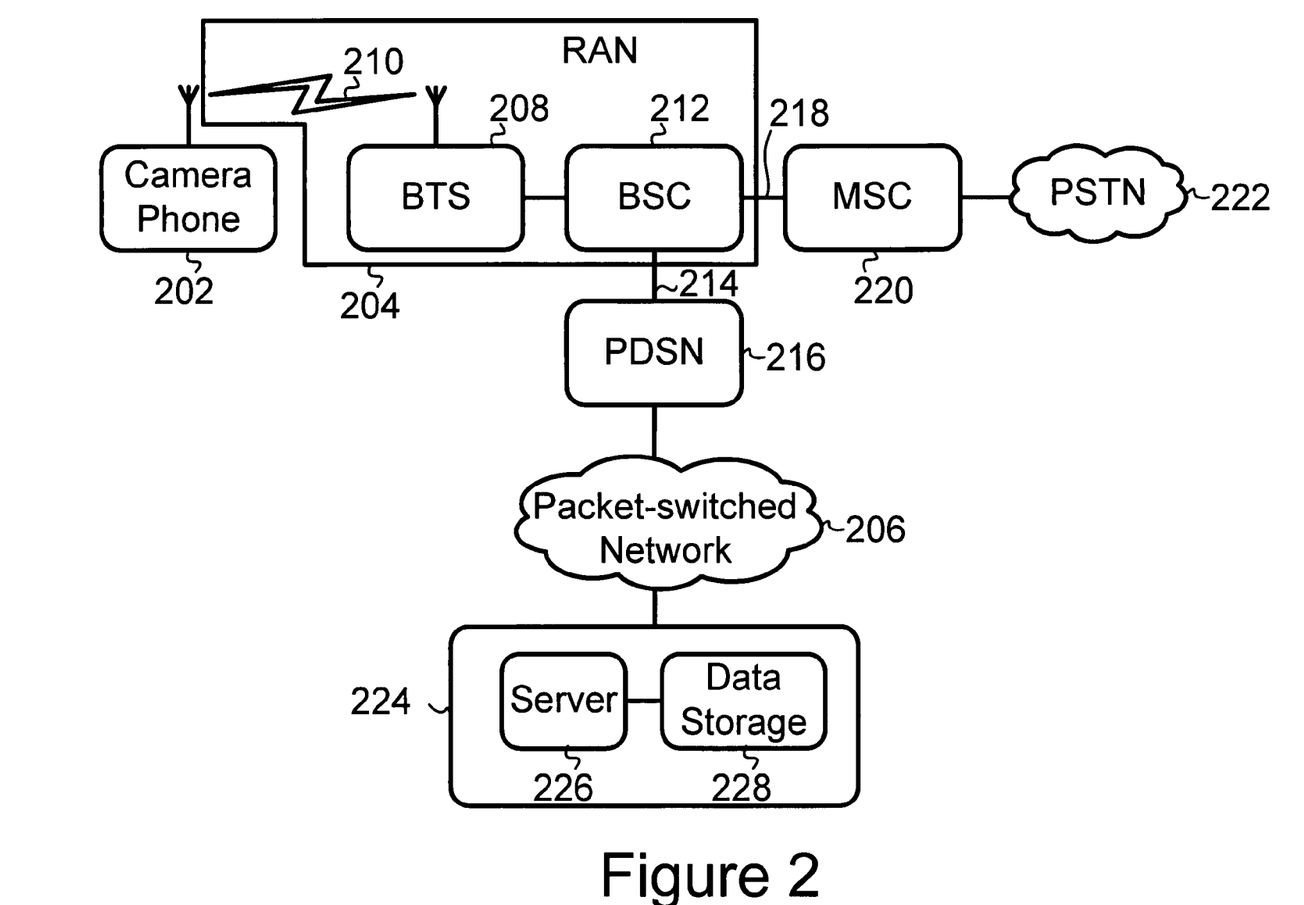
FIG. 2 is a block diagram of a system in which an exemplary embodiment can be carried out.

Turning to FIG. 2, this figure depicts a system 200 for use with an exemplary embodiment of the present invention. As illustrated, the system 200 includes a camera phone 202, a radio access network (RAN) 204, and a packet-switched network 206 (e.g., the Internet).

The camera phone 202 may be arranged as the camera phone 100 shown in FIG. 1.

The RAN 204 includes a base transceiver station (BTS) 208, a radio frequency (RF) air interface 210 operating between the camera phone 202 and the BTS 208, and a base station controller (BSC) 212. The BTS 208 radiates RF signals away from the BTS 208 to form a cell. The radiated RF signals are arranged according to an air interface protocol, such as the CDMA air interface protocol or some other air interface protocol. The BTS 208 may include an antenna for radiating RF signals and a tower for mounting the antenna at an elevation above ground level.

The BSC 212 performs many functions. For example, the BSC 212 manages the use of the BTS 208 and any other base transceiver stations that may be coupled to the BSC 212. The BSC 212 controls handoff of a wireless device, such as the camera phone 202, from one base transceiver station to another base transceiver station as the wireless device moves from one cell to another cell. The BSC 212 provides (i) connection interface to a first coupling mechanism 214 that connects to a packet-switched network gateway 216, and (ii) connection interface to a second coupling mechanism 218 that connects to a mobile switching center (MSC) 220.

The MSC 220 performs switching functions to set up and tear down calls via a public switched telephone network (PSTN) 222. As an example, the MSC 220 can set up and tear down a phone call placed by the camera phone 202 to a remote telephone coupled to the PSTN 222. As another example, the MSC 220 can set up and tear down a phone call placed to the camera phone 202 from a remote telephone coupled to the PSTN 222.

The packet-switched network gateway 216 is a gateway between the BSC 212 and the packet-switched network 206. The packet-switched network gateway 216 may convert data in a first form that is compatible with transmitting on a first network (e.g., the RAN 204) to data in a second form that is compatible with transmitting on a second network (e.g., the packet-switched network 206). An example of the packet-switched network gateway 216 is a packet data serving node (PDSN). Other examples of the packet-switched network gateway 216 are also possible.

The packet-switched network 206 is coupled to a network system 224. The camera phone 202 can establish a radio link with the RAN 204 and a data link (e.g., a point-to-point protocol (PPP) link) with the packet-switched network gateway 216. Through those links, the camera phone 202 can send and receive packet data over the packet-switched network 206 so as to communicate with the network system 224.

The network system 224 may be arranged in various configurations. For example, the network system 224 may include a server 226, and a data storage device 228 that is coupled to the server 226. The server 226 may include a network interface card (NIC) that provides connection interface to the packet-switched network 206. Although the server 226 and the data storage device 228 are shown as separate entities, the two entities could instead be co-located and integrated together.

The server 226 may be arranged to execute various program instructions. For example, the server 226 may execute program instructions for processing data (e.g., digital images, video streams, audio clips, or update values) sent from the camera phone 202 to the server 226 over the RAN 204 and the packet-switched network 206. The program instructions for processing the data may include instructions for storing data, received from the camera phone 202, at the data storage device 228.

As another example, the server 226 may execute program instructions for changing a cumulative value stored at the data storage device 228. For example the server 226 may execute program instructions to add a received update value to a cumulative value. As another example, the server 226 may execute program instructions for decrementing a cumulative value by an incentive value after a camera phone user has been awarded a given incentive.

As yet another example, the server 226 may execute program instructions for transmitting data to the packet-switched network 206 for transmission in turn to the camera phone 202. Examples of data transmitted by the server 226, for transmission in turn to the camera phone 202, include: (i) data that indicates which camera phone instructions are associated with an incentive program, (ii) data that includes an application program for carrying out one or more new functions associated with the incentive program, or (iii) data that instructs the camera phone 202 to begin detecting (or stop detecting) the performance of the functions associated with the incentive program. Other examples of the data transmitted by the server 226, for transmission in turn to the camera phone 202, are also possible.

The data storage 228 may store various types of data. For example, the data storage 228 may store (i) program instructions executable by the server 226, (ii) update values sent over a network from a camera phone, (iii) a cumulative value for each camera phone that has been enrolled in the incentive program, and (iv) digital images sent over a network from a camera phone. The data storage 228 may include digital photo albums for storing the digital images. Other examples of the data that may be stored in the data storage 228 are also possible.

In order to store data, the data storage 228 may comprise a computer readable medium, such as a magnetic disc, an optical disc, organic memory, and/or any other volatile or non-volatile mass storage system readable by the server 226. Alternatively, the data storage 228 may comprise a combination of two or more segments of computer readable media. For example, data storage 228 may comprises a first segment of data storage located in the server 226 and a second segment of data storage remote from the server 226. Other examples of the data storage 228 are also possible.

It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

3. Exemplary Operation

Figure 3:
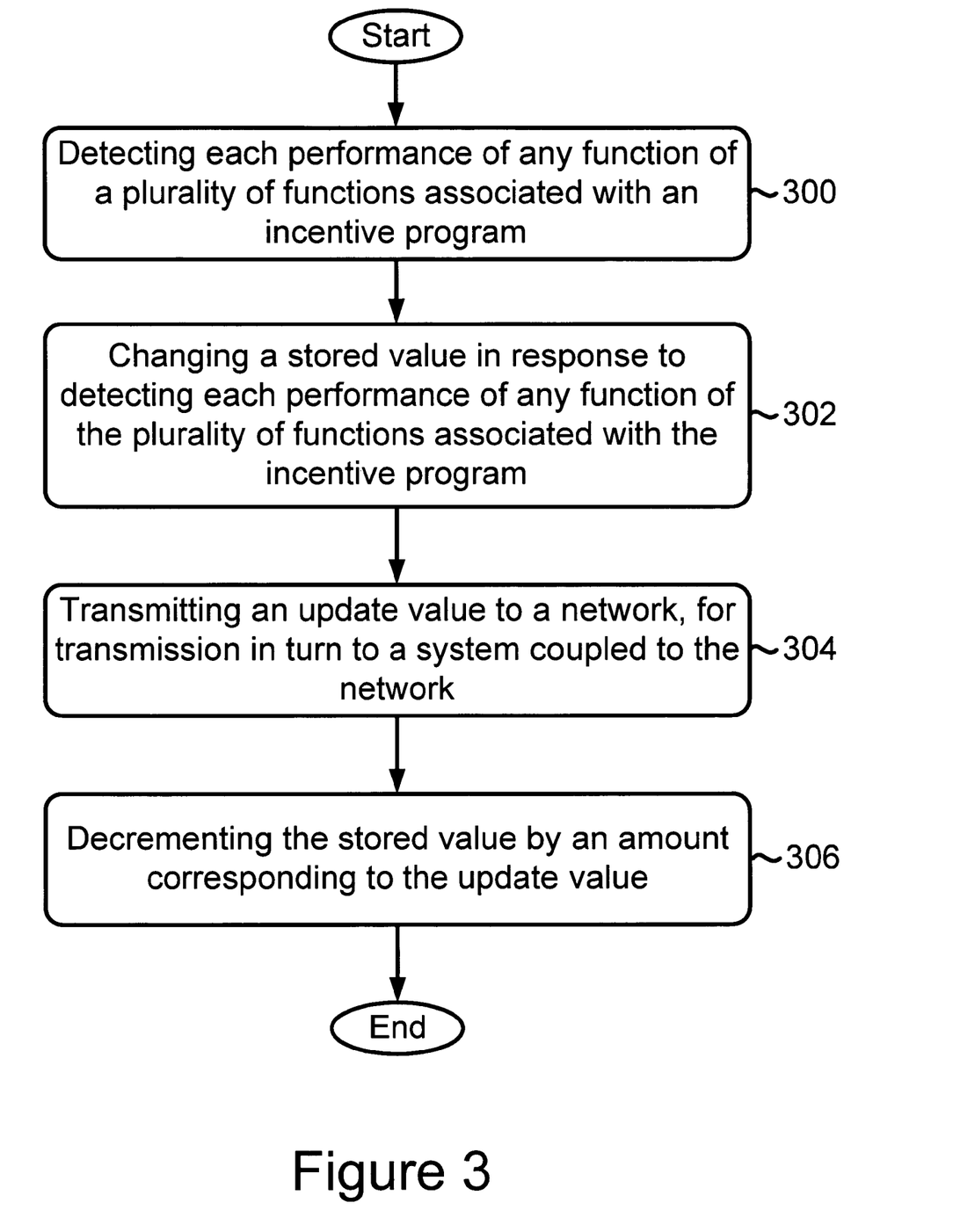
FIG. 3 is a flow chart depicting a set of functions that can be carried out in accordance with the exemplary embodiment.

FIG. 3 is a flow chart provided to illustrate some of the functions that may be carried out with the exemplary embodiment. As shown in FIG. 3, block 300 involves detecting each performance of any function of a plurality of functions associated with an incentive program. The plurality of functions may be functions carried out within a camera phone and/or functions carried out remote from the camera phone. Detecting each performance of any function of the plurality of functions associated with the incentive program may be carried out in various ways. For example, a processor, such as the processor 106, may be arranged to (i) detect signals produced by an input mechanism of the user interface 104, and (ii) execute a first set of program logic in response to detecting the signals produced by the input mechanism, where the first set of program logic provides means for determining whether each detected signal from the input mechanism indicates the performance of a function associated with the incentive program.

As another example, a processor may be arranged to (i) detect signals produced by an output mechanism of the user interface 104, and (ii) execute a second set of program logic in response to detecting the signals produced by the output mechanism, where the second set of program logic provides means for determining whether each detected signal from the output mechanism indicates the performance of a function associated with the incentive program.

As yet another example, detection of each performance of any function of the plurality of functions may be carried out by executing program instructions that allow the processor to detect each performance of any function of the plurality of functions. In this regard, the program instructions may comprise an increment counter instruction that is executed each time a function of the plurality of functions is performed. In this way, each time the counter is incremented, the processor may detect that one of the functions associated with the incentive program was performed. Other examples of detecting each performance of any function of the plurality of functions associated with the incentive program are also possible.

Next, block 302 involves changing a stored value in response to detecting each performance of any function of the plurality of functions associated with the incentive program.

Each function associated with the incentive program may be assigned a respective function value. For example, a first function, such as capturing an image, may have a first function value of 100. As another example, a second function, such as sending an image to a network to share with another camera phone user, may have a second function value of 200. As yet another example, a third function, such as sending an image to a network, for storage of the image at a remote data storage device, may have a third function value of 300. Alternatively, each respective function value could have the same value, such as 100. Other examples of the value of the respective function values are also possible.

Changing the stored value in response to detecting each performance of any of the plurality of functions associated with the incentive program may be carried out in various ways. In one respect, changing the stored value in response to detecting each performance of any function of the plurality of functions may be carried out by changing the stored value by an amount equivalent to a sum of function values associated with each function of a series of functions performed and detected. For example, if the processor 106 detects the performance of a series of functions that include the first function (first function value of 100) and the second function (second function value of 200), then the sum of function values associated with each function of this series is 300. In this case, the stored value is incremented by 300.

In another respect, changing the stored value in response to detecting each performance of any function of the plurality of functions may be carried out by changing the stored value after each instance of detecting a performed function. For example if the processor 106 detects the performance of the first function (first function value of 100) followed by the second function (second function value of 200), the processor 106 first increments the stored value by 100, then increments the stored value by 200.

In yet another respect, changing the stored value in response to detecting each performance of any function of the plurality of functions may be carried out by (i) incrementing the stored value if a function of the first type is performed and detected, and (ii) decrementing the stored value if a function of the second type is performed and detected. In this regard, the function of the first type may comprise the first function, the second function, or the third function, and the function of the second type may comprise a fourth function, such as deleting a digital image that was not sent to share. The fourth function may have a fourth function value of 50.

By way of example, changing the stored value in response to detecting performance of the first function (function value of 100) and the fourth function (function value of 50) may comprise (i) incrementing the stored value by 100 and decrementing the stored value by 50, or (ii) incrementing the stored value by 50, which is the difference between the first function value and the fourth function value. Other examples of changing the stored value in response to detecting each performance of any function of the plurality of functions associated with the incentive program are also possible.

Next, block 304 involves transmitting an update value to a network, for transmission of the update value in turn to a system coupled to the network. Transmitting the update value to a network may be carried out in various ways. For instance, if the network comprises (i) a RAN, and (ii) a wired packet-switched network, then a communication interface, such as the communication interface 110, may establish a radio link with the RAN, and a data link with a packet-switched network gateway that links the RAN with the packet-switched network. Through those links, the communication interface may transmit the update value to the network, for transmission of the update value in turn to a system coupled to the network.

As another example, a communication interface may include a mechanism for coupling to a device (not shown), such as a personal computer with a modem that couples to the packet-switched network via a coupling link (e.g., a local loop telephone line coupled to the PSTN 222 or a cable television coaxial cable). In this way, the communication interface may transmit the update value to the device, which in turn transmits the update value to the packet-switched network 206 for further transmission of the update value to the system coupled to the network. Other examples of transmitting an update value to a network for transmission in turn of the update value to a system coupled to the network are also possible.

Next, block 306 involves decrementing the stored value by an amount that corresponds to the update value. Decrementing the stored value may occur so as to prevent a cumulative value from being changed more than once for each performance and detection of a given function (or given series of functions) of the plurality of functions associated with the incentive program. Decrementing the stored value is thus a way to avoid awarding a camera phone user with an incentive award that the camera phone user has not yet earned.

Decrementing the stored value by an amount that corresponds to the update value may be triggered using various methods. For example, decrementing the stored value by an amount that corresponds to the update value may occur in response to transmission of the update value to the network. As another example, decrementing the stored value by an amount that corresponds to the update value may occur in response to receiving, from a system coupled to the network, an acknowledgement that indicates the system has received the update value. As yet another example, decrementing the stored value by an amount that corresponds to the update value may occur in response to (i) transmission of the update value to the network, and (ii) receiving, from a system coupled to the network, an acknowledgement that indicates the system has received the update value.

In one respect, the amount that corresponds to the update value may be equivalent to the update value. The amount that corresponds to the update value may be equivalent to the update value if the update value was not adjusted by an adjustment factor (e.g., an adjustment factor for providing extra incentive to perform the functions associated with the incentive program at night or on the weekends). For example, if a first update value is 500 and the first update value was not adjusted by an adjustment factor, then the amount that corresponds to the update value is 500. In this case, the stored value will be decremented by 500.

In another respect, the amount that corresponds to the update value may not be equivalent to the update value, but instead may be equivalent to an update value that has been adjusted by an adjustment factor. For example, if a second update value is 2,000 and the second update value is based on an adjustment factor that comprises a multiplier of 2, then the amount that corresponds to the update value is 1,000 (i.e., 1,000×2=2,000). In this case, the stored value will be decremented by 1,000. Other examples where the amount that corresponds to the update value is not equivalent to the update value are also possible.

4. Conclusion

An incentive program that motivates camera phone users to perform camera phone functions that lead to the use of a network infrastructure is desirable because camera phone users may pay a fee for each use of the network infrastructure. With such an arrangement, service providers can change the incentive program accordingly so as to maximize the fees paid by the camera phone users in order to recover the infrastructure expense incurred by the service providers and to increase the profits associated with providing services via the network infrastructure.

Exemplary embodiments of the present invention have been described above. Those skilled in the art will understand, however, that changes and modifications may be made to the embodiments described without departing from the true scope and spirit of the present invention, which is defined by the claims.

I claim:

1. A method comprising:
   a camera phone detecting performance of any of a plurality of camera phone functions associated with an incentive program;
   the camera phone changing a stored value in response to detecting performance of any of the plurality of camera phone functions associated with the incentive program; and
   the camera phone transmitting an update value to a network, for transmission in turn to a system coupled to the network, wherein the update value corresponds to the stored value.

2. The method of claim 1, wherein changing the stored value in response to detecting each performance of any of the plurality of camera phone functions, comprises incrementing the stored value if the camera phone function performed and detected is a first type of function.

3. The method of claim 2, wherein changing the stored value in response to detecting each performance of any of the camera phone functions, further comprises decrementing the stored value if the camera phone function performed and detected is a second type of function.

4. The method of claim 1, further comprising decrementing the stored value by an amount corresponding to the update value, in response to transmitting the update value to the network.

5. The method of claim 1, further comprising:
   receiving, from the network, an acknowledgement, sent by the system, that indicates the system has received the update value; and
   decrementing the stored value by an amount corresponding to the update value, in response to receiving the acknowledgement from the network.

6. The method of claim 1, further comprising:
   receiving the update value at the system; and
   adding the update value to a cumulative value stored in data storage of the system.

7. The method of claim 6, further comprising selecting an incentive award that corresponds with a given incentive value, wherein the given incentive value is less than or equal to the cumulative value.

8. The method of claim 7, further comprising:
   decrementing the cumulative value stored in data storage of the system by the given incentive value.

9. The method of claim 1, further comprising establishing a communication session with the system prior to transmitting the update value to the network.

10. The method of claim 1, further comprising:
the camera phone displaying the stored value, a menu that lists the functions associated with the incentive program, and an indication that the stored value is greater than or equal to a given incentive value.

11. The method of claim 1, further comprising:
the camera phone playing out an audible tone that indicates a function of the plurality of camera phones associated with the incentive program has been performed.

12. The method of claim 1, further comprising:
the camera phone playing out an audible tone that indicates the stored value is greater than or equal to a given incentive value.

13. The method of claim 1, wherein the update value is a percentage of the stored value.

14. A camera phone comprising:
a processor for executing program logic to (i) detect performance of any of a plurality of camera phone functions associated with an incentive program, and (ii) change a stored value in response to detecting performance of any of the plurality of camera phone functions associated with the incentive program;
data storage for storing the program logic and the stored value; and
a communication interface for transmitting an update value to a network, for transmission in turn to a system coupled to the network, wherein the update value corresponds to the stored value.

15. The camera phone of claim 14, wherein the program logic to change the stored value comprises logic for incrementing the stored value if a camera phone function performed and detected is a first type of function.

16. The camera phone of claim 15, wherein the first type of function is selected from the group consisting of (i) capturing an image, (ii) sending an image to share, (iii) sending an image to store, (iv) accessing a stored image, (v) receiving an image via the communication interface, (vi) viewing an image, (vii) formatting an image, (viii) applying a fun-frame graphic to an image, (ix) editing an image, (x) correlating an image with a recipient identifier, and (xi) sending a signal to enroll in the incentive program.

17. The camera phone of claim 15, wherein the program logic to change the stored value further comprises logic for decrementing the stored value if a camera phone function performed and detected is a second type of function.

18. The camera phone of claim 17, wherein the second type of function is selected from the group consisting of (i) deleting a digital image, (ii) deleting a digital image that has not been sent to share, (iii) deleting a digital image that has not been sent to store, and (iv) sending a signal to end participation in the incentive program.

19. The camera phone of claim 14, further comprising a user interface for performing the plurality of camera phone functions associated with the incentive program.

20. The camera phone of claim 14, wherein the communication interface comprises a wireless communication interface for establishing a wireless data session through which to communicate with the system.

21. The camera phone of claim 14, wherein the program logic comprises logic for decrementing the stored value by an amount that corresponds to the update value.

22. The camera phone of claim 14, wherein the system comprises (i) another processor for executing additional program logic for adding the update value to a cumulative value that corresponds to the camera phone, and (ii) data storage for storing the additional program logic and the cumulative value.

23. A camera phone comprising:
means for detecting performance of any of a plurality of camera phone functions associated with an incentive program;
means for changing a stored value in response to detecting performance of any of the plurality of camera phone functions associated with the incentive program; and
means for transmitting an update value to a network, for transmission in turn to a system that adds the update value to a cumulative value, wherein the update value corresponds to the stored value.

24. The camera phone of claim 23, further comprising means to perform the plurality of camera phone functions associated with the incentive program.

* * * * *